United States Patent [19]
Gallagher et al.

[11] Patent Number: 5,848,145
[45] Date of Patent: Dec. 8, 1998

[54] AUTOMATIC LEARNING OF NETWORK ROUTING USING RANDOM ROUTES

[75] Inventors: Donald D. Gallagher, Boulder; Robert J. Serkowski, Broomfield, both of Colo.

[73] Assignee: Lucent Technologies Inc., Murray Hill, N.J.

[21] Appl. No.: 770,280

[22] Filed: Dec. 20, 1996

[51] Int. Cl.$^6$ ................................................ H04M 7/00
[52] U.S. Cl. ........................ 379/220; 379/207; 379/229; 370/255
[58] Field of Search ................................ 379/219, 220, 379/221, 229, 230, 231, 242, 245, 246, 207; 370/351, 255, 256, 254

[56] References Cited

U.S. PATENT DOCUMENTS

| | | | |
|---|---|---|---|
| 4,081,612 | 3/1978 | Hafner | 370/393 |
| 4,644,532 | 2/1987 | George et al. | 370/255 |
| 4,924,510 | 5/1990 | Le | 379/221 |
| 4,979,118 | 12/1990 | Kheradpir | 379/221 |
| 4,991,204 | 2/1991 | Yamamoto et al. | 379/221 |
| 5,014,262 | 5/1991 | Harshavardhana | 379/221 |
| 5,377,262 | 12/1994 | Bales et al. | 379/220 |
| 5,526,358 | 6/1996 | Gregerson et al. | 395/200.51 |
| 5,537,468 | 7/1996 | Hartmann | 379/221 |
| 5,559,877 | 9/1996 | Ash et al. | 379/221 |
| 5,708,702 | 1/1998 | De Paul et al. | 379/230 |
| 5,717,748 | 2/1998 | Sneed, Jr. et al. | 379/207 |
| 5,732,072 | 3/1998 | Thanner et al. | 370/255 |

FOREIGN PATENT DOCUMENTS 0699006  2/1996  European Pat. Off. ......... H04Q 3/66

OTHER PUBLICATIONS

Akiyama, et al., *Random Transfer Type Out–of–Chain Routing in Telecommunication Networks*, Transactions of the Institute of Electronics and Communication Engineers of Japan (IECE), vol. E 65, No. 11, Nov. 1982, p. 697 XP002060671.

*Primary Examiner*—Scott Wolinsky
*Attorney, Agent, or Firm*—John C. Moran

[57] ABSTRACT

A method and apparatus for automatically learning new routes within a distributed telecommunication switching system is disclosed. Randomly routed telecommunication calls are established from one of a plurality of originating switch nodes to one of a plurality of destination switch nodes over randomly selected telecommunication links not marked in an internal routing table of the originating switch node as being a route to the destination switch node. When each telecommunication call is established, a return message from the destination switch node provides routing information back to the originating switch node. Each originating switch node updates its routing table based on the results of the routing information returned when the random route is established. A random route is selected every predefined number of calls to each destination switch node.

10 Claims, 7 Drawing Sheets

LEVEL 5 ROUTING TABLE 402 – NODE 103

| TEL# | NODE |
|---|---|
| 8XX | 108 |
| 7XX | 107 |
| 6XX | 106 |
| 4XX | 104 |
| 2XX | 102 |
| 1XX | 101 |
| 301 | 103 |
| 302 | 103 |
| 303 | 103 |
| 304 | 103 |
| 305 | 103 |

LEVEL 4 ROUTING TABLE 403 – NODE 103

| NODE# | LDC OF | # OF HOPS |
|---|---|---|
| 108 | 117 | 1 |
| 107 | 117 | 2 |
| 106 | 117 | 2 |
| 104 | 113 | 1 |
| 102 | 112 | 1 |
| 101 | 112 | 2 |

FIG. 5

LEVEL 5 ROUTING TABLE 502 – NODE 102

| TEL# | NODE |
|---|---|
| 8XX | 108 |
| 7XX | 107 |
| 6XX | 106 |
| 4XX | 104 |
| 3XX | 103 |
| 1XX | 101 |
| 401 | 104 |
| 402 | 103 |
| 403 | 104 |
| 404 | 104 |
| 405 | 104 |

LEVEL 4 ROUTING TABLE 503 – NODE 102

| NODE# | LDC OF | # OF HOPS |
|---|---|---|
| 108 | 119 | 2 |
| 107 | 119 | 3 |
| 106 | 119 | 1 |
| 104 | 112 | 2 |
| 103 | 112 | 1 |
| 101 | 111 | 1 |

LEVEL 5 ROUTING TABLE 602 — NODE 106

| TEL# | NODE |
|---|---|
| 8XX | 108 |
| 7XX | 107 |
| 4XX | 104 |
| 3XX | 103 |
| 2XX | 102 |
| 1XX | 101 |
| 601 | 106 |
| 602 | 106 |
| 603 | 106 |
| 604 | 106 |
| 605 | 106 |

LEVEL 4 ROUTING TABLE 603 — NODE 106

| NODE# | LDC OF | # OF HOPS |
|---|---|---|
| 108 | 118 | 1 |
| 107 | 118 | 2 |
| 104 | 118 | 3 |
| 103 | 118 | 2 |
| 102 | 119 | 1 |
| 101 | 120 | 1 |

FIG. 7

LEVEL 5 ROUTING TABLE 302 — NODE 101

| TEL# | NODE |
|---|---|
| 8XX | 108 |
| 7XX | 107 |
| 6XX | 106 |
| 4XX | 104 |
| 3XX | 103 |
| 2XX | 102 |
| 101 | 101 |
| 102 | 101 |
| 103 | 101 |
| 104 | 101 |
| 105 | 101 |

LEVEL 4 ROUTING TABLE 303 — NODE 101

| NODE# | LDC OF | # OF HOPS |
|---|---|---|
| 108 | 120 | 2 |
| 107 | 120 | 3 |
| 106 | 120 | 1 |
| 106 | 111 | 2 |
| 104 | 111 | 3 |
| 104 | 120 | 4 |
| 103 | 120 | 3 |
| 103 | 111 | 2 |
| 102 | 111 | 1 |
| 102 | 120 | 2 |

LEVEL 5 ROUTING TABLE 302 – NODE 101

| TEL# | NODE |
|---|---|
| 10XX | 110 |
| 8XX | 108 |
| 7XX | 107 |
| 6XX | 106 |
| 4XX | 104 |
| 3XX | 103 |
| 2XX | 102 |
| 101 | 101 |
| 102 | 101 |
| 103 | 101 |
| 104 | 101 |
| 105 | 101 |

901 points to 10XX row.

LEVEL 4 ROUTING TABLE 303 – NODE 101

| NODE# | LDC OF | # OF HOPS |
|---|---|---|
| 110 | 141 | 1 |
| 108 | 120 | 2 |
| 107 | 120 | 3 |
| 106 | 120 | 1 |
| 106 | 111 | 2 |
| 104 | 111 | 3 |
| 104 | 120 | 4 |
| 103 | 120 | 3 |
| 103 | 111 | 2 |
| 102 | 111 | 1 |
| 102 | 120 | 2 |

902 points to 110 row.

FIG. 10

LEVEL 5 ROUTING TABLE 302 – NODE 101

| TEL# | NODE |
|---|---|
| 10XX | 110 |
| 8XX | 108 |
| 7XX | 107 |
| 6XX | 106 |
| 4XX | 104 |
| 3XX | 103 |
| 2XX | 102 |
| 101 | 101 |
| 102 | 101 |
| 103 | 101 |
| 104 | 101 |
| 105 | 101 |

LEVEL 4 ROUTING TABLE 303 – NODE 101

| NODE# | LDC OF | # OF HOPS |
|---|---|---|
| 110 | 141 | 1 |
| 108 | 120 | 2 |
| 108 | 144 | 2 |
| 107 | 120 | 3 |
| 106 | 120 | 1 |
| 106 | 111 | 2 |
| 104 | 111 | 3 |
| 104 | 120 | 4 |
| 104 | 141 | 2 |
| 103 | 120 | 3 |
| 103 | 111 | 2 |
| 103 | 142 | 2 |
| 102 | 111 | 1 |
| 102 | 120 | 2 |

1003 points to 108/144 row; 1001 points to 104/141 row; 1002 points to 103/142 row.

FIG. 11 though that central office may be located hundreds of miles away. In prior art packet switching systems, it is known to allow switching nodes to determine their own path through the packet switching system. U.S. Pat. No. 4,081,612 discloses a system where each switching node transmits multiple packets in order to find a route to a destination switching node. This is commonly referred to as broadcast routing.

AUTOMATIC LEARNING OF NETWORK ROUTING USING RANDOM ROUTES

TECHNICAL FIELD

This invention relates to a switching system having a plurality of distributed switching nodes, and, in particular, to the automatic learning of new routes through the switching system by the switching nodes.

BACKGROUND OF THE INVENTION

In a prior art telecommunication switching system comprising a plurality of switching nodes, each switching node requires a predefined knowledge of how the interconnection of switching nodes is accomplished. An example of such a system is the public telephone network in the United States. Within the United States, telephones are grouped in terms of area codes, and within each area code the telephone numbers are further grouped by the first three digits of the telephone number. The telecommunication system itself involves tandem switching systems and central office switching systems. Each central office system is responsive for groups of telephone numbers with each group being specified by the first three digits of the telephone number. This hierarchy of telephone numbers is modeled after the hierarchy of switching nodes, e.g., central offices and tandem switching systems. Within each central office, the routes to be utilized to reach area codes or other groups of telephone numbers are predefined at system initialization or during system operation by the actions of a system administrator. With this predefined information, a central office can easily determine the communication path to route a telephone call from one of its own telephones to the telephone of another central office even though that central office may be located hundreds of miles away. In prior art packet switching systems, it is known to allow switching nodes to determine their own path through the packet switching system. U.S. Pat. No. 4,081,612 discloses a system where each switching node transmits multiple packets in order to find a route to a destination switching node. This is commonly referred to as broadcast routing.

U.S. Pat. No. 5,377,262 discloses a method of doing routing in distributed switching nodes utilizing the fact that the switching nodes are arranged in a first and second hierarchy. In addition, each switching node maintains routing information based on telephone and switching node numbers. A destination switching node transfers its routing information back to an originating switching node which combines that routing information with its own in order to determine shorter call paths for subsequent call routing. The first hierarchy is a dialing plan hierarchy having groups of switching nodes at each dialing plan level. The second hierarchy is a switching node hierarchy based on switching node numbers of each switching node with at least one switching node of the switching node hierarchy being at a different level in the dialing plan hierarchy. In order to route a call, a switching node first routes through levels of switching nodes in the dialing plan hierarchy until a second switching node is encountered which can determine the identification of the destination switching node based on a dialed telephone number. The second switching node then routes the call through the node hierarchy using the identified node number until a path is determined to the destination switching node.

These prior art methods suffer from many problems. With respect to the prior art telecommunication switching systems used in the public network, the major problem is the large databases which must be maintained in various central offices. With respect to the broadcast methods used by the packet switching system or any other type of technique which relies solely on the address for finding the destination, these types of methods absorb a large amount of communication bandwidth within the packet switching system as well as place a real time load on each packet switching node. With respect to the method disclosed in U.S. Pat. No. 5,377,262, the techniques used in this U.S. Patent suffer from the problem that they are not quick to determine how to utilize new switch nodes that have just been installed in a distributed switch node system and to determine new routes around a failed switch node.

SUMMARY OF THE INVENTION

The foregoing problems are solved, and a technical advance is achieved by an apparatus and method for use in a distributed telecommunication switching system in which each switch node places a certain number of telecommunication calls to individual destination switch nodes over randomly selected telecommunication links not marked in an internal routing table as being routes to those individual destination switch nodes. When a telecommunication call is established, a return message from the destination switch node provides routing information back to the originating switch node. Each originating switch node updates its routing table based on the results of the routing information returned when the random route is established. Advantageously, a random route is selected every predefined number of calls to each destination switch node.

Other and further aspects of the present invention will become apparent during the course of the following description and by reference to the accompanying drawing.

DETAILED DESCRIPTION

Figure 1:
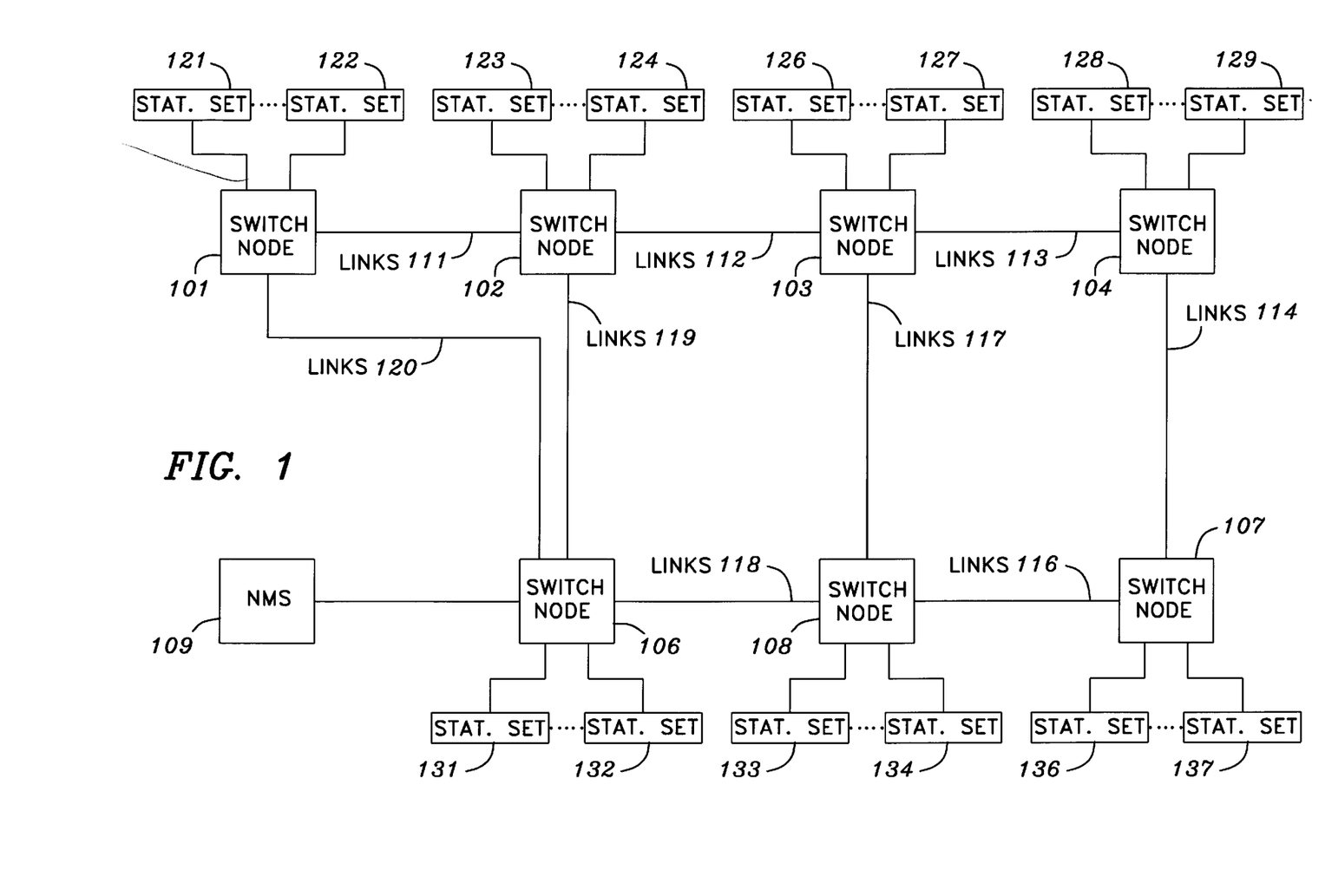
FIG. 1 illustrates a telecommunication switching system embodying the inventive concept.

FIG. 1 illustrates a telecommunication system having a plurality of distributed switch nodes 101–104 and 106–108. Each switch node is providing service for a plurality of telecommunication station sets such as station sets 121–124, 126–129, 131–134, 136 and 137. The switch nodes are interconnected by communication links such as primary rate interface (PRI) or basic rate interface (BRI) links. Each set of links such as links 11–114 and 116–120 may consist of a plurality of PRI or BRI links.

Unlike the distributed switch node systems of the previously referenced U.S. patent, the telecommunication system illustrated in FIG. 1 does not have a dialing plan hierarchy of switch nodes nor a switch node hierarchy. When each switch node initializes, it obtains the telephone numbers of the station sets assigned to the initializing switch node by placing a call to network manager service (NMS) 109. In addition, to getting the actual telephone numbers of the station sets assigned to a switch node, each switch node receives the identification of the blocks of telephone numbers assigned to each of the other switch nodes in the telecommunication system illustrated in FIG. 1. The manner in which a switch node initializes the links interconnecting it to other switch nodes and switches calls through the switch node architecture is similar to U.S. Pat. No. 5,377,262 which is hereby incorporated by reference. Each switch node also receives from NMS 109, for each assigned station set, the handset service record (HSR) and the feature service record (FSR) associated with each station set. The handset service record defines the type of station set and its configuration. The feature service record defines what features can be utilized by the station set, the associated buttons on the station set to invoke particular features, and features that are active.

Figure 3:
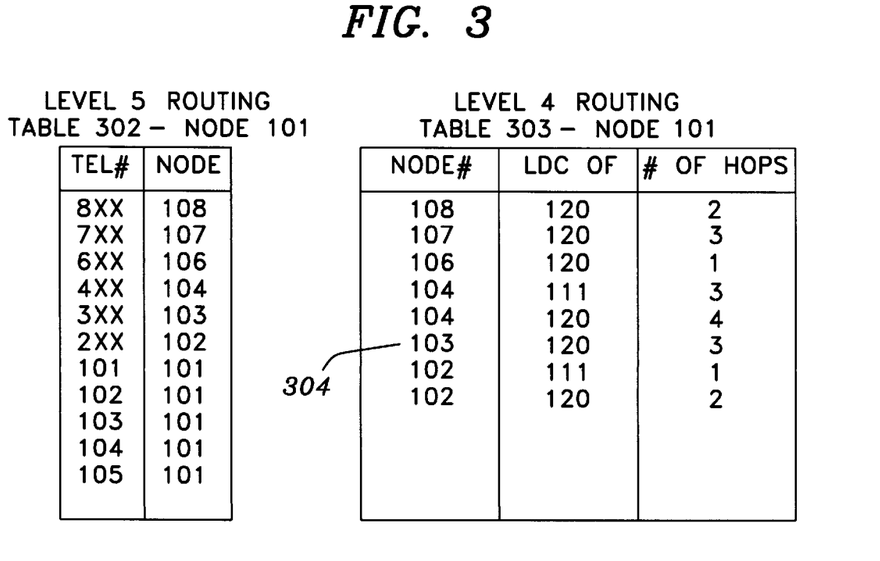
FIGS. 3–7 illustrate routing tables utilized by the telecommunication switching system.
Figure 4:
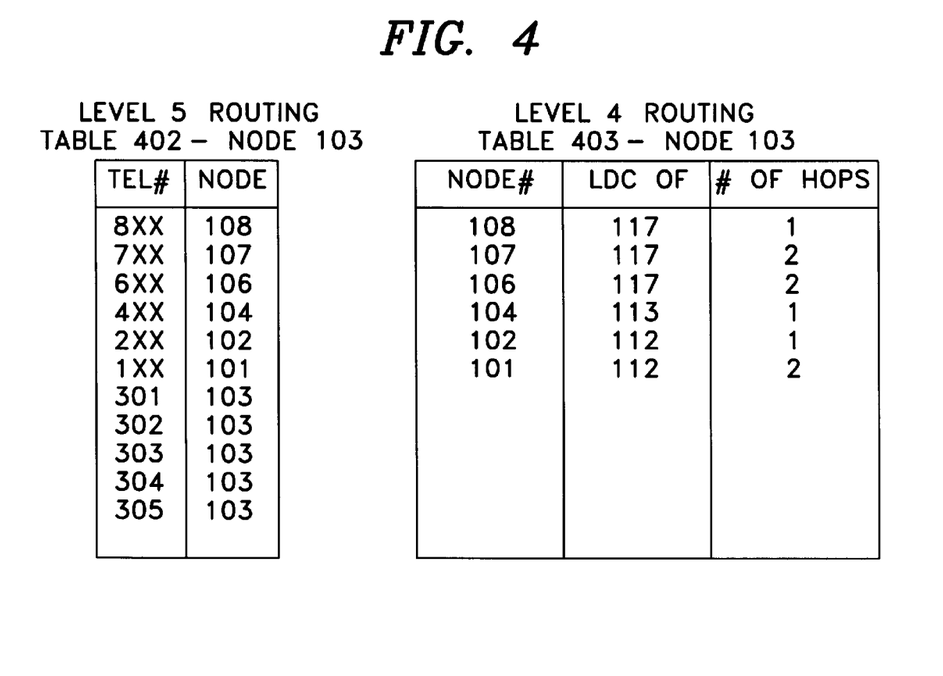

FIG. 3 illustrates the telephone numbers and related node information obtained from NMS 109 in table 302. For simplicity, each node is assumed to control a hundred telephone numbers with the hundredth digit reflecting the last digit of the node number. For example, node 108 controls telephone numbers 8XX indicating all 800 telephone numbers. For simplicity, it is assumed that each node has only five actual telephone numbers assigned to it however. For example, node 101 has telephone numbers 101–105 assigned to it as illustrated in table 302. Table 303 of FIG. 3 indicates how node 101 routes calls to other switch nodes. As will be explained later, the LDC refers to the links leaving switch node 101.

Figure 5:
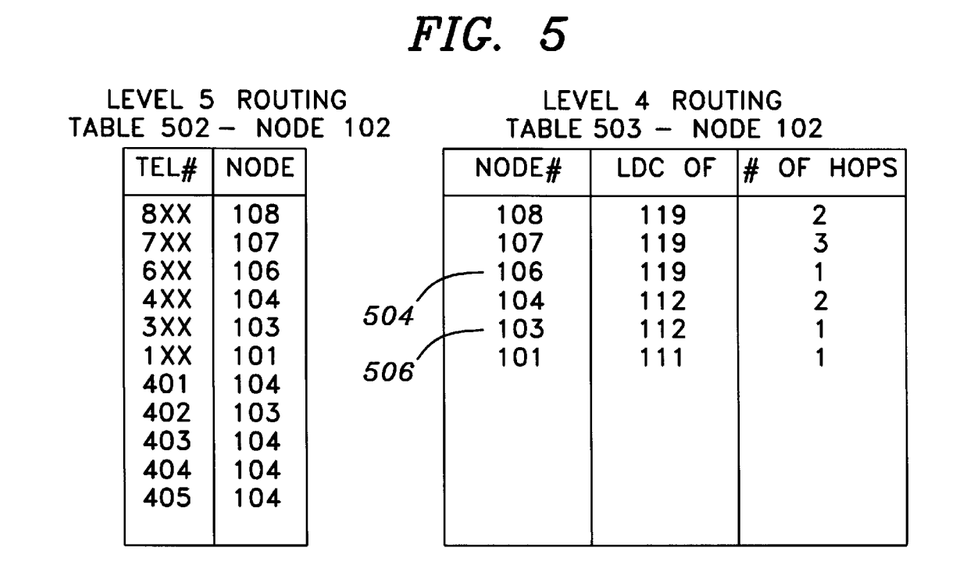
Figure 6:
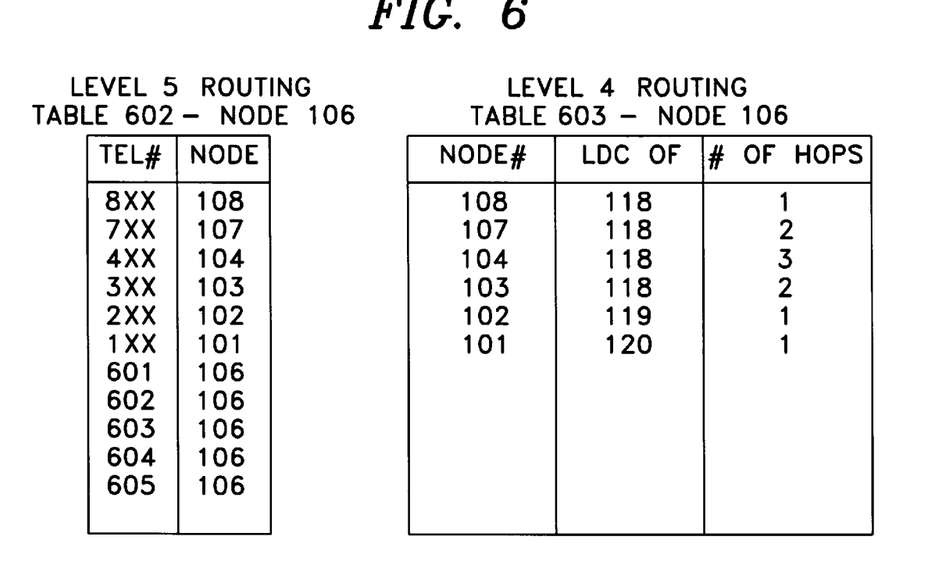
Figure 7:
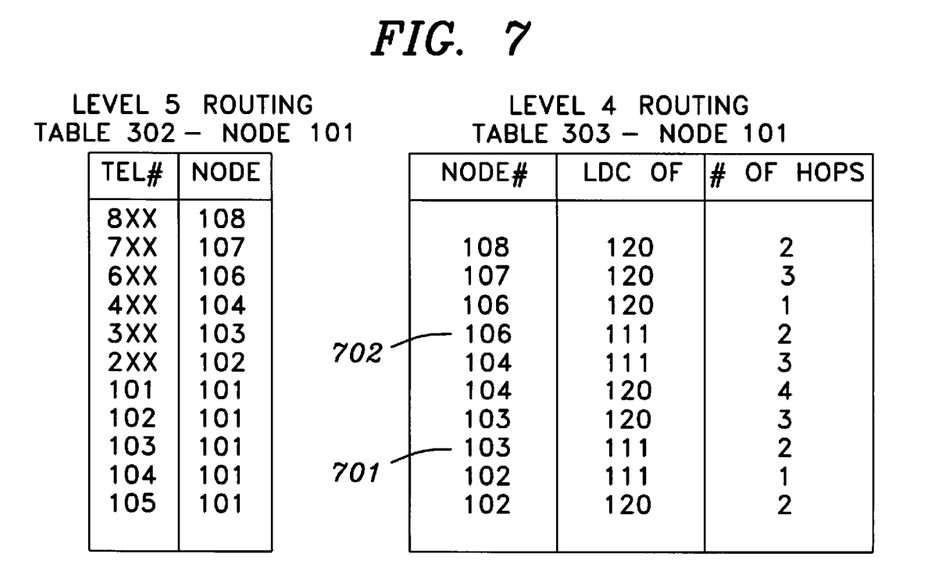

Table 303 of FIG. 3 illustrates the routes that switch node 101 has learned about in order to route calls to other switch nodes. As can be seen by comparing table 303 with FIG. 1, switch node 101 has an additional route to switch node 103 via links 111, switch node 102, and links 112. In accordance with the present invention, switch node 101 learns of this route to switch node 103 via links 111 in the following manner. Normally, switch node 101 routes calls to switch node 103 using links 120 as detailed in line 304 of table 303. The manner in which the switch nodes route calls through other switch nodes is set forth in the above-incorporated U.S. Patent. After every "n" calls to switch node 103, in response to a call destined for switch node 103, switch node 101 routes the call through links that are not listed in table 303 as routes to switch node 103. "n" is a predefined number. Normally, a switch node has a plurality of links interconnecting it to other switch nodes. In the present example, switch node 101 transmits a setup message to switch node 103 via links 111 even though switch node 101 is unaware that a call can be routed to switch node 103 via links 111. Switch node 102 is responsive to the setup message received on links 111 to examine table 503 of FIG. 5 and determine from line 506 that calls can be routed to switch node 103 via links 112. The call is then routed to switch node 103 which responds with an alerting message. Within the alerting message, the number of links that were used to route the call from switch node 101 to switch node 103 is included. This number of links is referred to as the number of hops in the level 4 routing tables of FIGS. 3–7. Switch node 101 is responsive to the alerting signal to update table 303 by inserting line 701 into table 303 as illustrated in FIG. 7. Table 403 which defines the routing for switch node 103 is modified to reflect the fact that a route exists via links 112 to switch node 101.

At a later point in time, switch node 101 routes a call to switch node 106 again randomly selecting links 111. Switch node 102 is responsive to the setup message directed to switch node 106 to examine table 503 of FIG. 5 and determine from line 504 that calls can be routed to switch node 106 via links 119. When switch node 106 responds with the alerting message back to switch node 101, the number of hops is included in this message. Switch node 101 is responsive to the message to update table 303 of FIG. 7 by inserting line 702. Switch nodes 102–104 and 106–108 also perform this random selection of links attempting to route calls to other switch nodes. In this manner, each switch node determines the various route to the other switch nodes.

Figure 8:
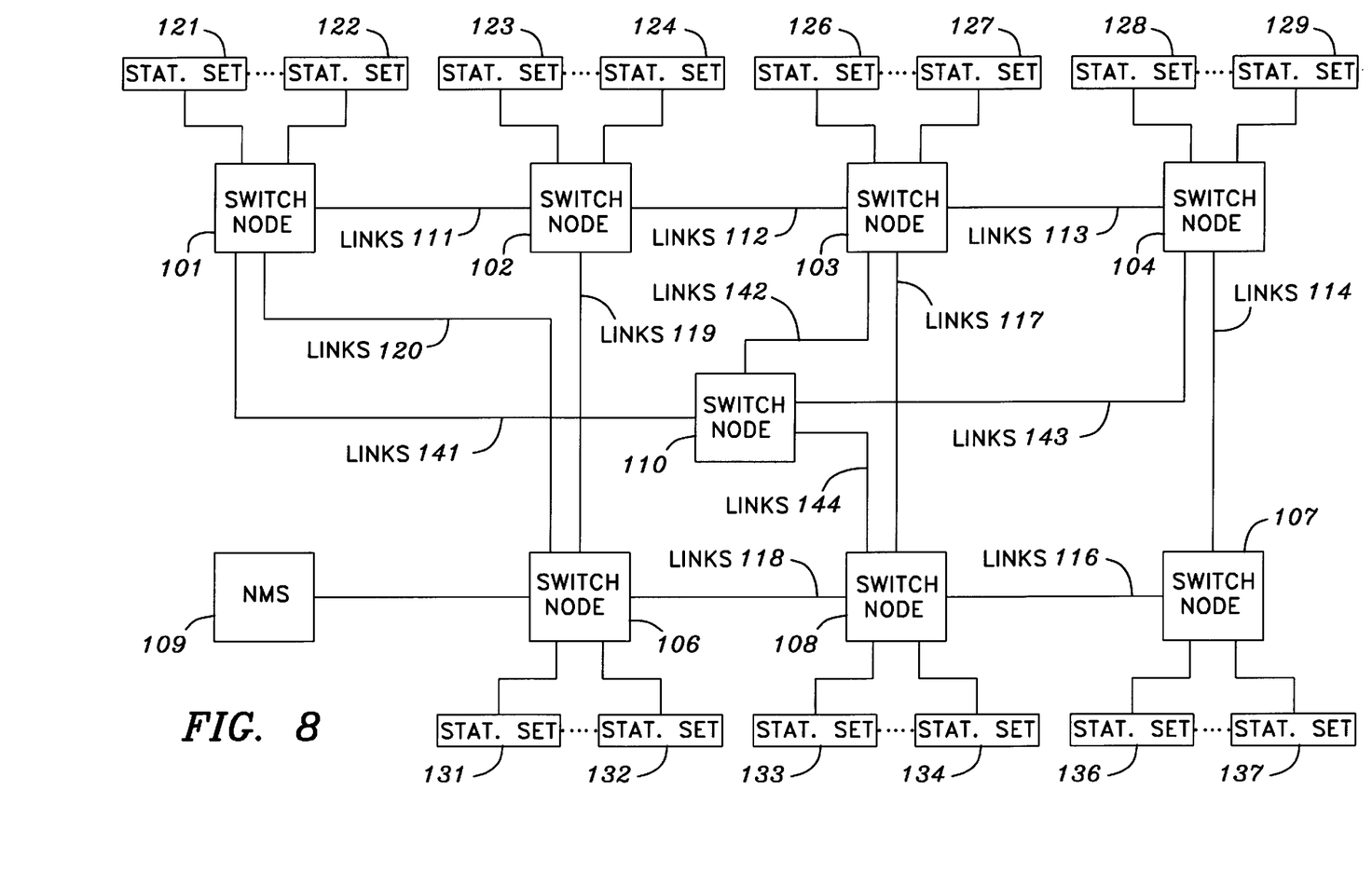
FIG. 8 illustrates the wireless telecommunication switching system with the addition of a new switch node.
Figure 9:
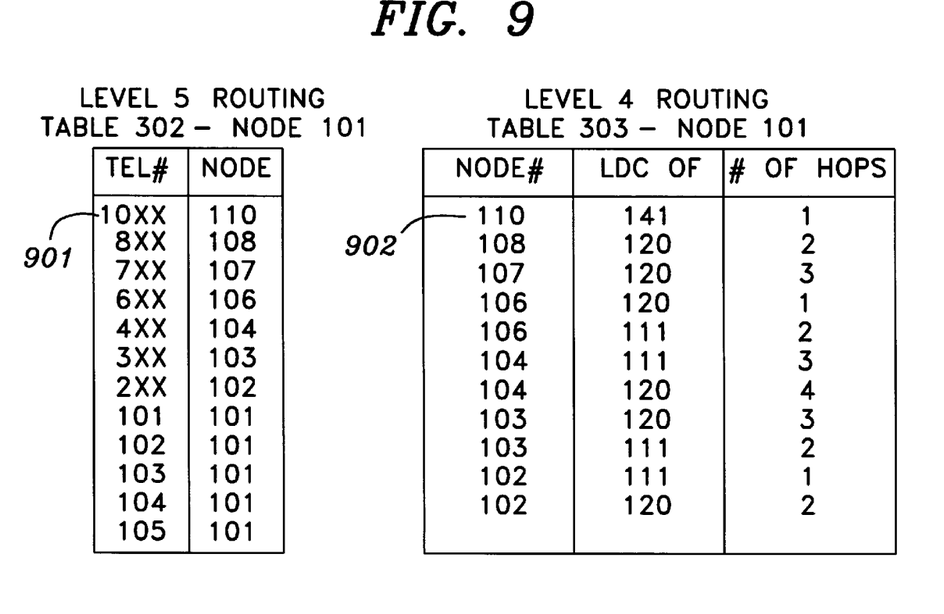
FIGS. 9 and 10 illustrate new routing tables utilized by the telecommunication switching system.
Figure 10:
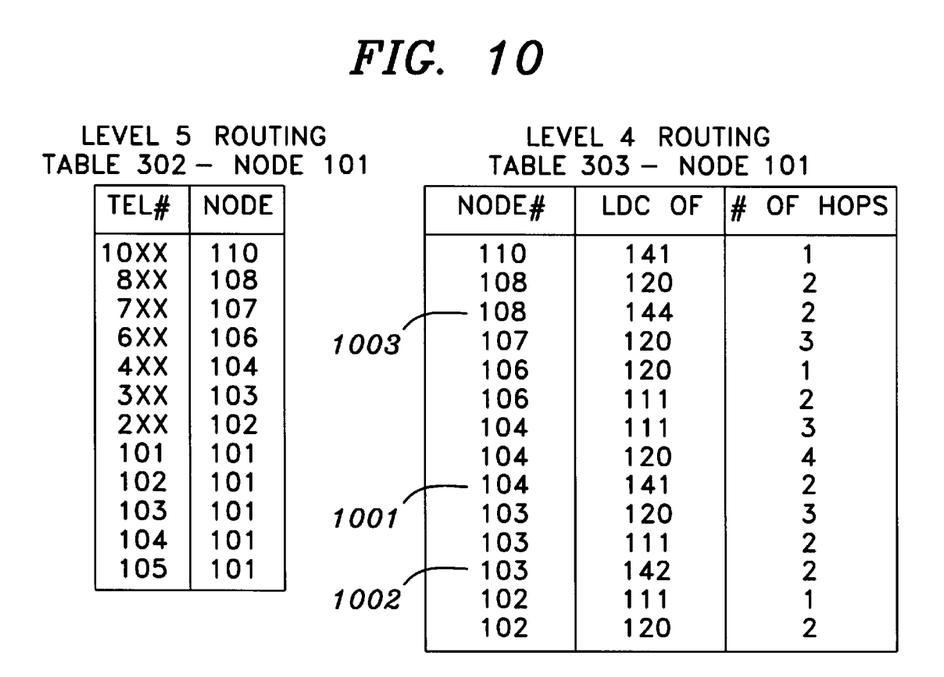

FIG. 8 illustrates the switching system of FIG. 1 with the addition of a new switch node, switch node 110. When switch node 110 is installed in the system, NMS 109 informs switch nodes 101–104 and 106–108 of the numbers controlled by this switch node. For example, FIG. 9 illustrates that switch node 101 received the information concerning switch node 110 and inserted lines 901 into table 302. As was described in the previously incorporated U.S. Patent, switch node 101 becomes aware of switch node 110 when switch node 110 initializes links 141. After "n" calls to switch node 104, when switch node 101 wishes to route a call to switch node 104, switch node 101 randomly selects links 141. Switch node 110 is responsive to the setup message directed to switch node 104 to route this setup message to switch node 104 via links 143. Switch node 104 responds with an alerting message which informs switch node 101 that it is now possible to reach switch node 104 via links 141. In response to this alerting message, switch node 101 inserts into table 303 of FIG. 10, line 1001. Similarly, in other points in time, switch node 101 randomly determines how to route calls via links 141 to switch nodes 103 and 108 and inserts lines 1002 and 1003, respectively.

Figure 2:
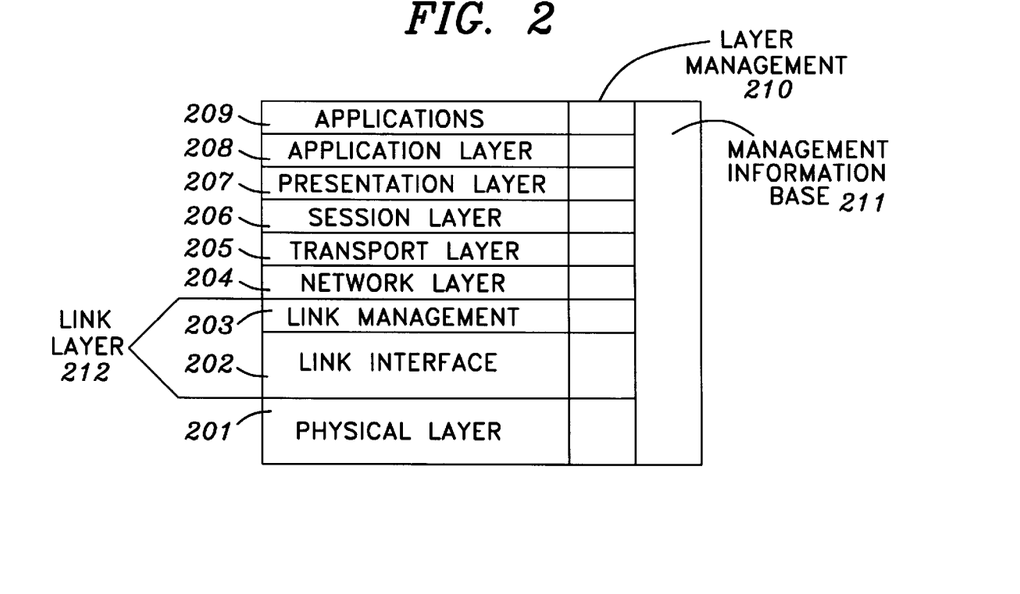
FIG. 2 illustrates the software layers of the software architecture implemented in each switch node.

FIG. 2 illustrates the software architecture of the switching nodes of FIG. 1. This architecture is based on the conventional OSI model modified to implement the integrated services digital network (ISDN) protocol. In accordance with the invention as described herein, certain further modifications have been made to the standard model in order to include ISDN capabilities.

The principal function of physical layer 201 is to terminate physical links. Specifically, physical layer 201 is responsible for maintaining physical channels and for controlling physical subchannels thereon. Physical layer 201 comprises a software portion and physical interfaces. Further, the software portion of physical layer 201 is responsible for the direct control of the physical interfaces to which physical links communicating PRI and BRI information terminate. Physical layer 201 presents to link layer 212 physical subchannels and physical channels as entities controllable by link layer 212.

The primary function of link layer 212 is to assure that the information transmitted over a physical channel is recovered intact and in the correct order. This is accomplished using another layer of protocol which allows multiple communication paths—commonly referred to as logical links—to be established on a given physical channel or a physical subchannel communicating packetized data. These logical links are used to identify and process data being communicated between link layer 212 and physical layer 201. (An example of this type of protocol is the LAPD packet protocol used in ISDN Q.921. In the ISDN standard, link layer 212 terminates the LAPD protocol.) Link layer 212 can support multiple protocols so that the upper layers are uneffected by the different protocols being utilized. Further, link layer 212 allows higher software layers to control physical layer 201 in an abstract manner.

As seen in FIG. 2, link layer 212 is divided into link interface 202 and link management 203. The reason for this division is set forth herein below. It will be helpful at this point to discuss the communication of ISDN signals over a D channel to help readers, for example, who have only a rudimentary knowledge of the communication of ISDN signals over a D channel. At link layer 212, a plurality of logical links is established on a D channel. Only one of these logical links communicates ISDN control signals, and this logical link is referred to herein as a logical D channel (LDC). The LDC is identified by a logical D channel number (LDCN).

Link interface 202 does the majority of the functions performed by link layer 212, including the establishment of the logical links. Link management 203 identifies the various link interfaces for higher software layers. Further, link management communicates information between the logical links and higher software layers.

Network layer 204 processes information communicated on the LDCs, and thereby terminates the ISDN Q.931 protocol. Hence, this layer is responsible for negotiating the utilization of system resources for the termination or origination of calls external to a switching node. The network layer controls the allocation of channels on an interface on which a call is being received or set up. For example, if switching node 101 receives a call from switching node 102 via links 111, network layer 204 of switching node 101 negotiates with its peer layer (the corresponding network layer 204 in switching node 102) in order to obtain allocation of a B channel in links 111—a procedure later to be repeated if a second B channel is desired. This negotiation is carried out using standard ISDN Q.931 messages such as the call setup and connection messages via the LDC setup on the D channel of links 111. Network layer 204 identifies all B channels of given interface with the LDC for that interface. Network layer 204 is only concerned with the establishment of a call from one point to another point (e.g., switching node to switching node). The network layer is not concerned with how a call is routed internally to a particular switching node but rather transfers information up to higher layers for the determination of how a call is routed in the switching node. However, the network layer does request that one application, referred to here and below as the connection manager application, add or remove facilities on a physical interface to a switch connection within a switching node.

Specifically, the network layer carries out call setup by first determining that the request for the establishment of a call is valid and that the resources between the two switching systems are available to handle this call. After this determination, information concerning the call is transferred to higher software layers. The reverse is true when the network layer receives a request from the higher software layers to establish a connection with another switching node.

Network layer 204 receives information from another node concerning a call via a LDC. As information is received on the LDC, a call reference number is utilized to identify the call associated with this message. The call reference number is selected by the originating network layer during call setup in accordance with the ISDN standard.

Transport layer 205, is the key element that allows the routing of a call through a complex system having multiple nodes as illustrated in FIG. 1. Its primary function is to manage the routing of calls externally, i.e., between switching nodes. Transport layer 205 views the system of FIG. 1 in terms of nodes and is concerned with routing calls from its own node to other nodes or endpoints. (As explained in the discussion of session layer 206, that layer, not transport layer 205, interprets logical destination information, such as a telephone number, to determine the destination node of a call and to establish an intra-node path by using the connection manager application.) In an overall system comprising multiple switching nodes such as switching node 101, the various transport layers communicate with each other in order to establish a call through the various switching nodes. This communication between transport layers is necessary because it may be necessary to route the call through intervening nodes to reach the destination node. The transport layers communicate among themselves utilizing signaling paths (LDCs) established between switching nodes.

With respect to inter-node routing, transport layer 205 is the first layer that starts to take a global view of the overall system illustrated in FIG. 1. Transport layer 205 uses information provided by session layer 206 to select the inter-node path. The transport layer performs its task of routing between various nodes by the utilization of tables defining the available paths and the options on those paths. These tables do not define all paths but only those paths which the node has already used.

Communication between transport layers is done by network layer 204 using established LDCs. Transport layer 205 communicates information destined for its peers to network layer 204, and network layer 204 packages this information within the information elements, IEs, of standard ISDN Q.931 messages. Network layer 204 uses the LDC that has been setup to a particular node to communicate this information to its peer network layer. Similarly, when another network layer receives information of this type, the other network layer unpackages information and then directs the information to the transport layer.

The primary function of session layer 206 is to establish communication among endpoints with all endpoints considered to be applications including, for example, a station set is considered an application. Significantly, these endpoints may be applications such as the application performing the call processing features or the dialing plan application. In any event, connections between such endpoints is considered a call. A session (call) is set up by session layer 206 any time two applications require communication with each other. As noted earlier, session layer 206 deals only in terms of switching nodes and applications on those switching nodes and relies on transport layer 205 to establish paths to other switching nodes. Session layer 206 identifies the called application by an address which previously in the telecommunication art was thought of as only a telephone number but has a much broader concept in the Q.931 protocol. From this address, session layer 206 determines the destination switching node. Session layer 206 sets up a call to the destination switching node by communicating with the session layer of the destination switching node. The communication with the other session layer is accomplished by having the session layer request its transport layer to place a call to the other switching node so that a connection can be made for a particular address. The transport layer places the call relying on the node number that was determined by the session layer. These requests are done using the network layer to generate standard ISDN Q.931 call setup messages. If the other switching node cannot interpret the address, the session layer of that switching node transmits information to its transport layer requesting that the call be dropped. If the session layer can interpret the address, it sends a message to its transport layer requesting that a call proceeding message be transmitted by its network layer back to the requesting switching node.

Presentation layer 207 of FIG. 2 invokes a complex protocol in order to groom the information being communicated between applications so that the applications are totally divorced from the protocol used to communicate the information. A presentation level protocol allows an application to communicate with a peer application across a transport path.

Finally, application layer 208 manages the resources needed by the applications running at software layer 209. When an application at software layer 209 is communicating with another peer application, the application is unaware of how many other applications exist or where these other applications are located. It is the function of application layer 208 to determine and use such details, consequently allowing the applications to be written in a very abstract manner.

Management information base 211 stores data used by the different software layers. Layer management 210 provides the layer management entities required at each software layer.

Figure 11:
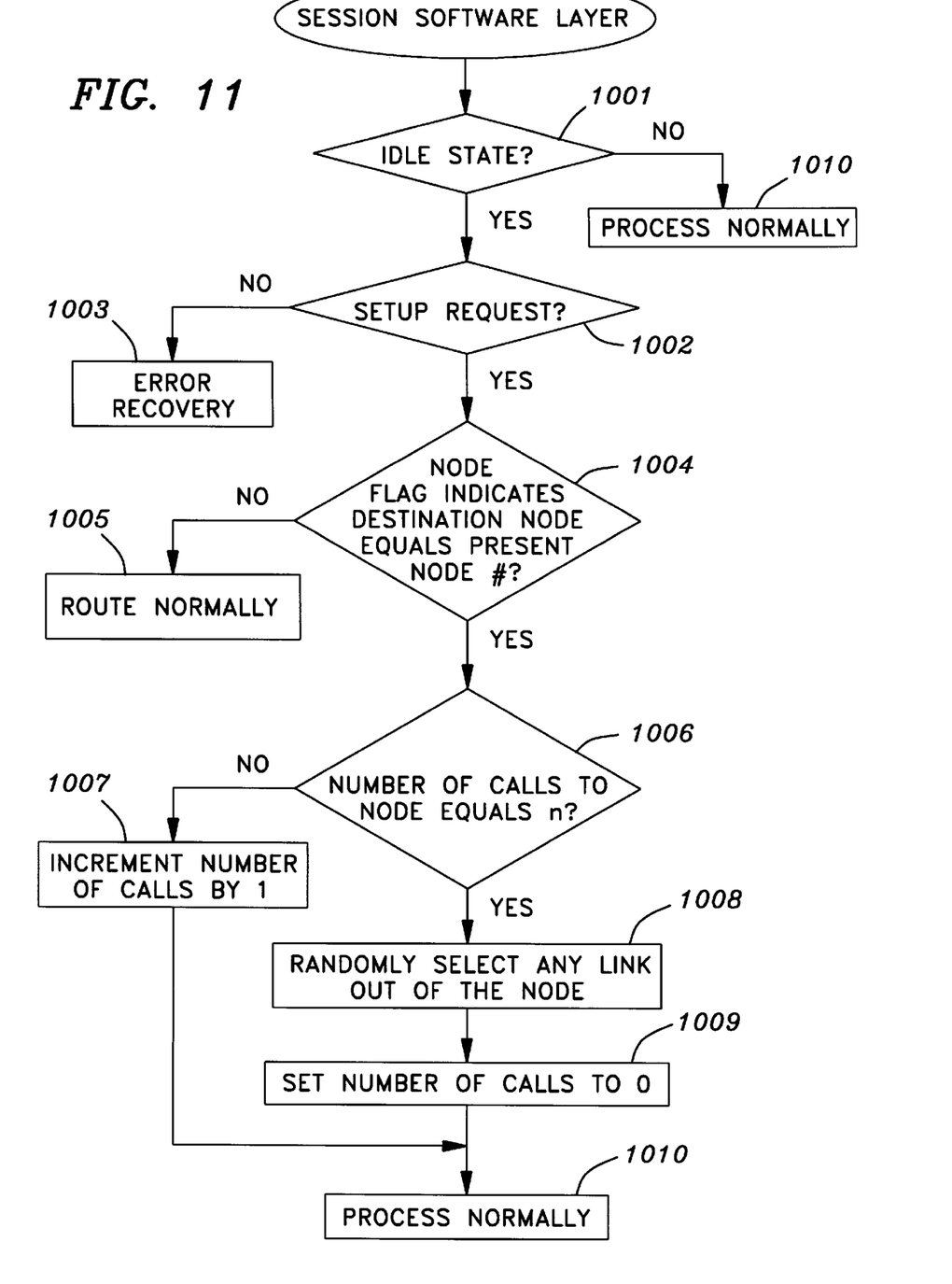
FIG. 11 illustrates steps performed by the transport software layer.

The steps performed by a switch node in routing calls through transport software layer 205 and session software layer 206 of FIG. 2 are described in FIGS. 22–26 of the previously incorporated U.S. Patent. If station set 121 places a call to station set 126 on switch node 103, a call setup message is received from station set 121 and is transferred via layers 201–205 of FIG. 2 executing in switch node 101 to session layer 206. Session layer 206 examines level 5 routing table 302 of table 5 and determines that the call should be routed to switch node 103. A setup request that includes the telephone number of station set 126 and the node number of switch node 103 is then transferred from session software layer 206 to transport software layer 205. FIG. 11 illustrates a portion of the operations performed by transport layer 205 as illustrated in FIG. 24 of the previously incorporated U.S. Patent.

Blocks 1001–1004 correspond to blocks 2401–2404 of FIG. 24 of the previously incorporated U.S. Patent. Decision block 1001 determines if the call is in the idle state. If the answer is no, block 1010 performs normal processing as illustrated in the previously referenced FIG. 24. If the answer is yes in decision block 1001, decision block 1002 determines if a setup request has been received from session software layer 206. If the answer is no, error recovery is performed by block 1003. If the answer is yes in decision block 1002, decision block 1004 determines if the node flag indicates that the destination node equals the present node number. If the answer is no in decision block 1004, this means that the switch node is a tandem node for a call being routed from another switch node. When the answer is no in decision block 1004, control is transferred to block 1005 which performs normal routing operations to route the call to the next switching node. If the answer is yes in decision block 1004, this means that the call originated on this switch node. Decision block 1006 then determines if "n" calls have been placed to the destination switch node. If the answer is no, block 1007 selects an available route from level 4 routing table 303 which has the fewest hops and transfers control to block 1009 which processes the setup message in the normal manner. Returning to decision block 1006, if the answer is yes, block 1008 randomly selects any link out of the switch node and uses this randomly select link to transmit the setup message. After execution of block 1008, block 1009 sets the "number of calls" to "0". Finally, block 1010 does the remaining part of the routing operation as described in the previously incorporated U.S. Patent including updating level 4 routing table 303 when the alerting message is received.

It is to be understood that the above-described embodiments are merely illustrative of the principles of the invention and that other arrangements may be devised by those skilled in the art without departing from the spirit and scope of the invention.

The invention claimed is:

1. A method of automatically learning new routes within a telecommunication switching system having a plurality of switch nodes interconnected by a plurality of groups of communication links, comprising the steps of:

accessing a routing table by a first one of the plurality of switch nodes to determine a first one of the plurality of groups of communication links to establish a first telecommunication call to a second one of the plurality of switch nodes;

randomly selecting by the first one of the plurality of switch nodes a second one of the plurality of groups of communication links to establish a second telecommunication call to the second one of the plurality of switch nodes;

transmitting a first type of message to establish the second telecommunication call to the second one of the plurality of switch nodes;

receiving by the first one of the plurality of switch nodes routing information in a second type of message from the second one of the plurality of switch nodes upon the second telecommunication call being established; and updating by the first one of the plurality of switch nodes the routing table using the received routing information.

2. The method of claim 1 further comprising the steps of:

calculating the rate of telecommunication calls from the first one of plurality of switch nodes; and performing the randomly selecting step upon a predefined rate of telecommunication calls occurring.

3. The method of claim 2 wherein the step of calculating comprises the step of counting a number of telecommunication calls to the second one of the plurality of switch nodes from the first one of the plurality of switch nodes and the predefined rate is determined by the occurrence of a predefined number of telecommunication calls whereby the step of randomly selecting is performed after each occurrence of the predefined number of telecommunication calls.

4. The method of claim 3 wherein the first type of message is an integrated services digital network (ISDN) setup message.

5. The method of claim 4 wherein the second type of message is an ISDN alerting message.

6. An apparatus for automatically learning new routes within a telecommunication switching system having a plurality of switch nodes interconnected by a plurality of groups of communication links, comprising:

means for accessing a routing table by a first one of the plurality of switch nodes to determine a first one of the plurality of groups of communication links to establish a first telecommunication call to a second one of the plurality of switch nodes;

means for randomly selecting by the first one of the plurality of switch nodes a second one of the plurality of groups of communication links to establish a second telecommunication call to the second one of the plurality of switch nodes;

means for transmitting a first type of message to establish the second telecommunication call to the second one of the plurality of switch nodes;

means for receiving by the first one of the plurality of switch nodes routing information in a second type of message from the second one of the plurality of switch nodes upon the second telecommunication call being established; and means for updating by the first one of the plurality of switch nodes the routing table using the received routing information.

7. The apparatus of claim 6 wherein the means for randomly selecting calculates the rate of telecommunication calls from the first one of plurality of switch nodes and is activated upon the occurrence of a predefined rate of telecommunication calls.

8. The apparatus of claim 7 wherein the means for randomly selecting counts a number of telecommunication calls to the second one of the plurality of switch nodes from the first one of the plurality of switch nodes and the predefined rate is determined by the occurrence of a predefined number of telecommunication calls whereby the means for randomly selecting is activated after each occurrence of the predefined number of telecommunication calls.

9. The apparatus of claim 8 wherein the first type of message is an integrated services digital network (ISDN) setup message.

10. The apparatus of claim 9 wherein the second type of message is an ISDN alerting message.

* * * * *